(12) United States Patent
Kimura et al.

(10) Patent No.: US 8,054,580 B2
(45) Date of Patent: Nov. 8, 2011

(54) PERPENDICULAR RECORDING MAGNETIC HEAD

(75) Inventors: Wataru Kimura, Kanagawa (JP);
Tadayuki Iwakura, Kanagawa (JP);
Yohji Marujama, Saitama (JP)

(73) Assignee: Hitachi Gloabl Storage Technologies Netherlands B.V., Amsterdam (NL)

( * ) Notice: Subject to any disclaimer, the term of this patent is extended or adjusted under 35 U.S.C. 154(b) by 898 days.

(21) Appl. No.: 12/079,223

(22) Filed: Mar. 24, 2008

(65) Prior Publication Data
US 2008/0231994 A1 Sep. 25, 2008

(30) Foreign Application Priority Data
Mar. 22, 2007 (JP) .................................. 2007-074658

(51) Int. Cl.
*G11B 5/31* (2006.01)
(52) U.S. Cl. ............ 360/125.1; 360/125.08; 360/125.12
(58) Field of Classification Search . 360/125.02–125.32
See application file for complete search history.

(56) References Cited

U.S. PATENT DOCUMENTS

| | | | |
|---|---|---|---|
| 2002/0176214 A1* | 11/2002 | Shukh et al. | |
| 2005/0013044 A1* | 1/2005 | Hirata et al. | 360/125 |
| 2005/0128637 A1* | 6/2005 | Johnston et al. | 360/125 |
| 2005/0141137 A1* | 6/2005 | Okada et al. | 360/122 |
| 2005/0286170 A1* | 12/2005 | Hirata et al. | 360/125 |
| 2006/0002018 A1* | 1/2006 | Fukui et al. | 360/125 |
| 2006/0002021 A1* | 1/2006 | Li et al. | 360/126 |
| 2006/0087765 A1* | 4/2006 | Iwakura et al. | 360/125 |
| 2006/0098339 A1* | 5/2006 | Koyama et al. | 360/126 |
| 2006/0203379 A1* | 9/2006 | Hirata et al. | 360/125 |
| 2006/0203381 A1* | 9/2006 | Okada et al. | 360/125 |
| 2006/0221497 A1* | 10/2006 | Okada et al. | |
| 2007/0206323 A1* | 9/2007 | Im et al. | 360/126 |
| 2007/0217069 A1* | 9/2007 | Okada et al. | 360/126 |
| 2007/0258167 A1* | 11/2007 | Allen et al. | 360/126 |

FOREIGN PATENT DOCUMENTS

| | | | |
|---|---|---|---|
| JP | 63-177307 A | * | 7/1988 |
| JP | 07-153013 A | * | 6/1995 |
| JP | 2004-127480 A | * | 4/2004 |
| JP | 2006-277834 | | 10/2006 |

* cited by examiner

*Primary Examiner* — Will J Klimowicz
(74) *Attorney, Agent, or Firm* — Zilka-Kotab, PC

(57) ABSTRACT

Embodiments of the present invention provide a perpendicular recording magnetic head having a narrow track width, high recording magnetic field intensity, and a good recording magnetic field distribution. According to one embodiment, a perpendicular recording magnetic head includes a read section and a write section. The write section includes a main magnetic pole layer, a lower sub magnetic pole layer, an upper sub magnetic pole layer, a pedestal magnetic layer, and a coil conductor generating a magnetic flux in the main magnetic pole layer. The write section further includes lower and upper auxiliary magnetic pole layers disposed on a leading side and a trailing side, respectively, relative to a medium moving direction, adjacent to the main magnetic pole layer. The lower and upper auxiliary magnetic pole layers are retracted from an air bearing surface. The upper auxiliary magnetic pole layer is retracted from the air bearing surface less than the lower auxiliary magnetic pole layer.

13 Claims, 13 Drawing Sheets

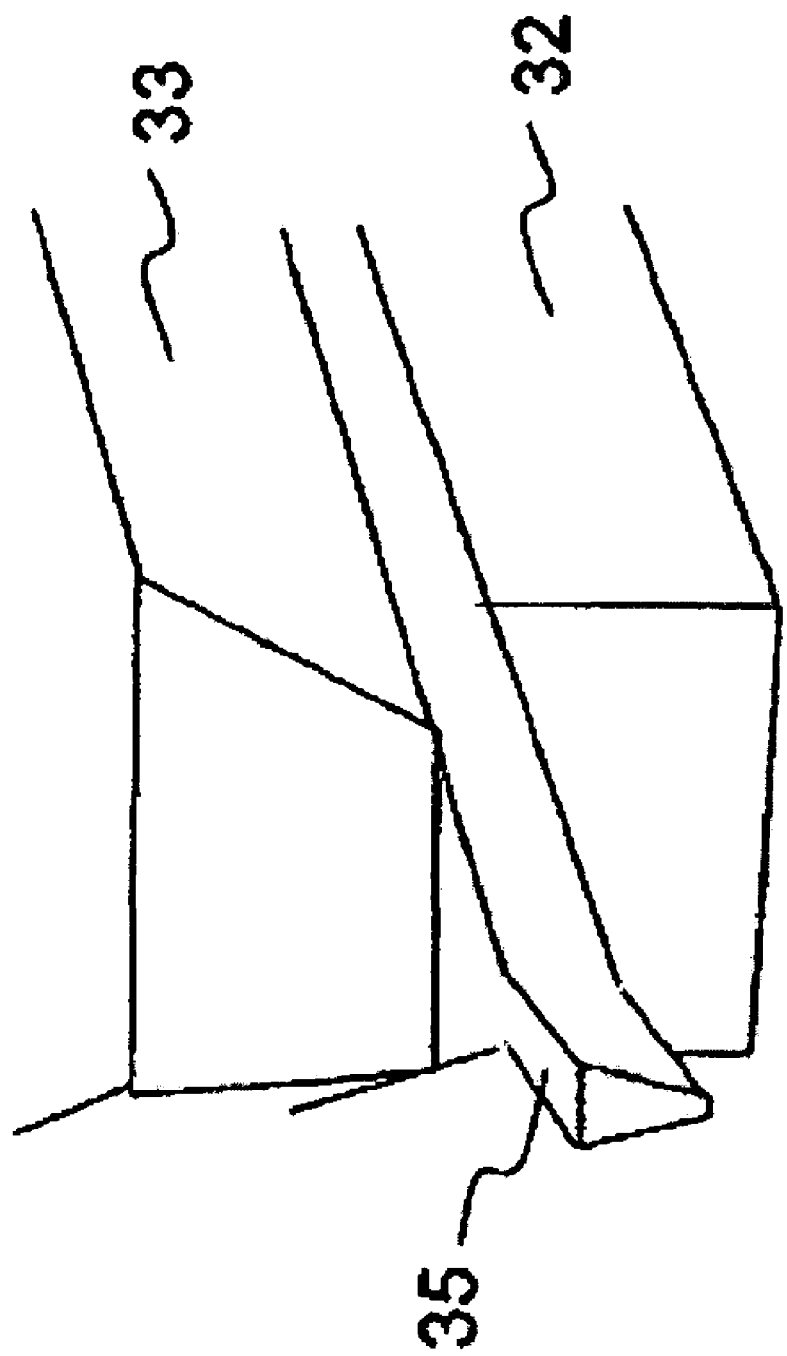

PERPENDICULAR RECORDING MAGNETIC HEAD

CROSS-REFERENCE TO RELATED APPLICATION

The instant nonprovisional patent application claims priority to Japanese Patent Application No. 2007-074658 filed Mar. 22, 2007 and which is incorporated by reference in its entirety herein for all purposes.

BACKGROUND OF THE INVENTION

In line with the recent development in the information society, market needs have emerged for more compact magnetic disk drives offering higher densities and higher speeds. Perpendicular recording is suitable for these market needs. For a theory of operation involved thereof, the perpendicular recording system is suitable for achieving higher surface recording densities for the following reasons; specifically, the higher the linear recording density of a pattern recorded on a disk has, the smaller the demagnetizing field is for more stabilized magnetization; a leak component from a magnetic field generated from a write head is small in a track width direction; and the like. The perpendicular recording system also acts favorably on thermal decay characteristics of the disk. As compared with longitudinal magnetic recording medium, therefore, the perpendicular recording system imposes less stringent restrictions on development of medium. It can therefore be expected to realize even lower noise medium. From the foregoing advantages of the perpendicular recording system, there will be a major shift in magnetic disk drives to perpendicular recording in the near future.

A perpendicular recording magnetic head includes a read section and a write section, one stacked on top of the other. The read section includes a lower shield layer and an upper shield layer. The read section further includes a read element surrounded by the upper and lower shield layers and having a portion exposed to an air bearing surface. Types of the read element used include a giant magnetoresistive effect head, a tunneling giant magnetoresistive effect head having a large read output, and a CPP type giant magnetoresistive effect head applying current perpendicularly to a film surface. The write section forms a magnetic gap on the side of the air bearing surface. The write section includes a main magnetic pole piece and a sub-magnetic pole piece magnetically coupled to each other on a side opposite the air bearing surface. A coil is disposed between the main magnetic pole piece and the sub-magnetic pole piece. In perpendicular magnetic recording, a magnetic field component in a perpendicular direction from the main magnetic pole piece is used to record information. To achieve this purpose, a soft magnetic underlayer (SUL) is disposed on a lower portion of a recording layer of the disk. The SUL opposes the main magnetic pole piece, which allows a ferromagnetic field of a perpendicular component to be generated. A magnetic flux in the SUL is returned, for circulation, to a soft magnetic film of the magnetic head that serves as the sub-magnetic pole piece.

A higher linear recording density (BPI) and a higher track density (TPI) are required to achieve a high recording density. To improve BPI, it is typically necessary to improve magnetic field gradient from a write head and to improve resolution of a read head. To improve TPI, it is necessary to make a track width of the write head narrower. With the track width becoming narrower, however, there is a remarkable trend toward decreased head magnetic field intensity and an expanded effective track width that is recorded on the medium relative to an actual geometrical track width. Japanese Patent Publication No. 7-153013 discloses an arrangement, in which a yoke is disposed on either side of a main magnetic pole piece. The arrangement is intended to reduce a leak magnetic flux that represents the following problem. Specifically, in perpendicular recording, a closed magnetic circuit through which the magnetic flux flows is long. This decreases the amount of magnetic flux due to the leak magnetic flux. This, in turn, decreases a read/write output. U.S. Patent Publication No. 2002/0176214 and Japanese Patent Publication No. 2004-127480 disclose an arrangement, in which a side shield is disposed near the main magnetic pole piece in order to suppress expansion of the effective track width. Japanese Patent Publication No. 2006-277834 discloses a structure of the main magnetic pole piece having a side surface recessed inwardly.

As described above, the write head is required to have a narrow track width to achieve high recording densities. To achieve that end, it becomes necessary to narrow down the geometrical track width of the write head. Narrowing the geometrical track width, however, entails a decrease in the magnetic field generated from the write head, with which data is written in the medium, resulting in degraded writing performance. In the prior art using a head of a single magnetic pole piece structure for perpendicular recording, measures are taken to make up for a reduction in the magnetic field from the write head as a result of the narrowed track width. The measures include: shortening a flare point of the main magnetic pole piece; and, increasing the film thickness. The shorter flare point leads to degraded geometrical track width accuracy and an expanded distribution of the head magnetic field in the track width direction, which makes it difficult to achieve a magnetically narrow track. Increasing the film thickness, on the other hand, poses a problem in that part of the main magnetic pole piece protrudes, if provided with a skew angle, to a space over a track adjacent to a recorded track, so that a signal recorded therein is erased. Even in a magnetic head including a side shield, the presence of the side shield invites a reduction in the recording magnetic field, while an expansion of writing can be reduced. This makes it necessary, as in the structure having no side shields, to take such measures as shortening the flare point of the main magnetic pole piece and increasing the film thickness. In an arrangement having yokes on both sides of the main magnetic pole piece, the magnetic field distribution expands in the track width direction if there is a magnetic field leak directly from the yokes to the recording medium. This hampers the attempt to narrow the track width. The arrangement also poses a problem in that the magnetic field leaking to the recording medium erases the information in the adjacent tracks.

BRIEF SUMMARY OF THE INVENTION

Embodiments of the present invention provide a perpendicular recording magnetic head having a narrow track width, high recording magnetic field intensity, and a good recording magnetic field distribution. According to the particular embodiment of FIG. 1, a perpendicular recording magnetic head includes a read section 11 and a write section 12. The write section 12 includes a main magnetic pole layer 35, a lower sub magnetic pole layer 31, an upper sub magnetic pole layer 34, a pedestal magnetic layer 36, and a coil conductor 39 generating a magnetic flux in the main magnetic pole layer 35. The write section 12 further includes lower and upper auxiliary magnetic pole layers 32, 33 disposed on a leading side and a trailing side, respectively, relative to a medium moving direction, adjacent to the main magnetic pole layer 35. The lower and upper auxiliary magnetic pole layers 32, 33 are retracted from an air bearing surface 41. The upper auxiliary magnetic pole layer 33 is retracted from the air bearing surface 41 less than the lower auxiliary magnetic pole layer 32.

BRIEF DESCRIPTION OF THE DRAWINGS

FIG. 2C is a perspective view showing a modified example of the tapered shape of the auxiliary magnetic pole layer.

DETAILED DESCRIPTION OF THE INVENTION

Figure 1:
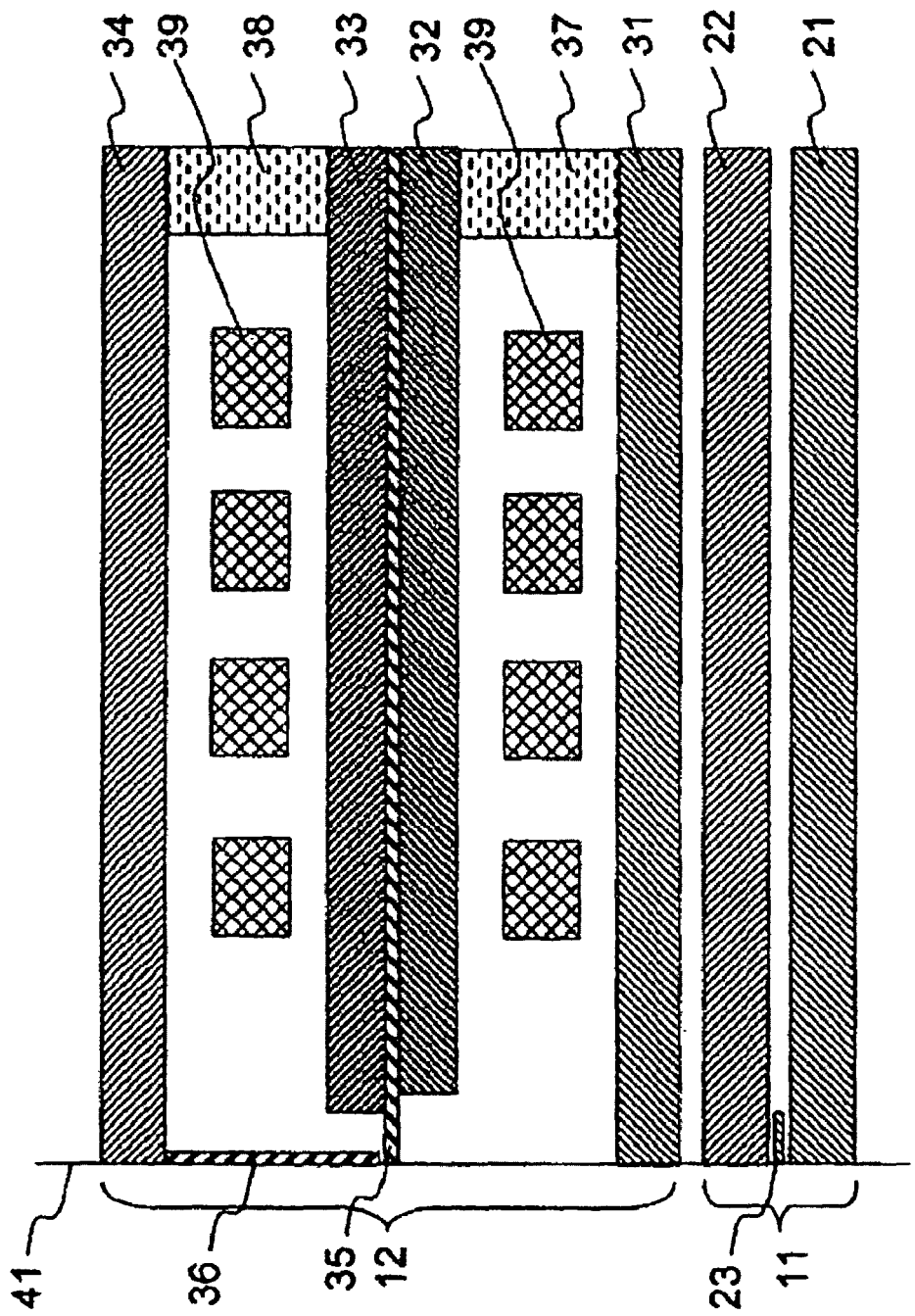
FIG. 1 is a cross-sectional view showing a perpendicular recording magnetic head according to a first embodiment of the present invention.

Embodiments of the present invention relate generally to a magnetic head used for writing and reading magnetic recording medium. More particularly, embodiments of the present invention relate to an element structure that achieves good recording performance with a narrow track in a recording magnetic head well adaptable for a perpendicular magnetic recording magnetic disk drive that records magnetization in a direction perpendicular to a medium surface.

It is an object of embodiments of the present invention to improve the magnetic field intensity, the magnetic field distribution, and the magnetic field gradient in a perpendicular recording magnetic head.

To achieve the foregoing object, according to an aspect of embodiments of the present invention, there is provided a perpendicular recording magnetic head comprising a read section having a magnetoresistive effect element and a write section having a main magnetic pole layer and an auxiliary magnetic pole layer. The magnetic head is characterized as comprising soft magnetic layers disposed on a trailing side and a leading side relative to a medium moving direction of the main magnetic pole layer. These soft magnetic layers are retracted from an air bearing surface. The magnetic head is further characterized in that an amount of retraction of the soft magnetic layer on the trailing side from the air bearing surface is smaller than that of the soft magnetic layer on the leading side. The amount of retraction of the soft magnetic layers from the air bearing surface is set in a range from 0.1 μm to 2.5 μm. A magnetic field generated from a write head increases as a film thickness of the soft magnetic layers increases and the amount of retraction of the soft magnetic layers from an air bearing surface decreases. A desired head magnetic field can therefore be achieved by adjusting the values of the film thickness and the amount of retraction.

The soft magnetic layers are tapered, facing the air bearing surface. The tapered shape is defined by an opening angle of a yoke layer or changes in film thickness. The soft magnetic layer on the trailing side may be tapered differently from the soft magnetic layer on the leading side.

The sub magnetic pole layer may be disposed on the leading side or the trailing side of the main magnetic pole layer, or on both sides thereof. The configuration, in which the sub magnetic pole layer is disposed on both sides of the main magnetic pole layer, is a cusp type. The soft magnetic layer and the sub magnetic pole layer are magnetically coupled to each other at a rear end in a direction of element height. With the cusp type, however, it is only necessary that the soft magnetic layer is magnetically coupled to at least either the upper or lower sub magnetic pole layer. The sub magnetic pole layer configuration may have a pedestal magnetic pole layer on the side of the air bearing surface.

A magnetic shield layer is disposed on the trailing side of the main magnetic pole layer near the air bearing surface by way of a non-magnetic layer. The magnetic shield layer may be magnetically coupled to the sub magnetic pole layer. The magnetic shield layer may still be configured to enclose the main magnetic pole layer by way of a non-magnetic layer.

A coil that energizes the write head may be either a helical type, in which the coil is wound so as to surround the soft magnetic layer, or a dual pancake type, in which a pancake coil is disposed on each the trailing side and the leading side across the soft magnetic layer.

In accordance with an aspect of embodiments of the present invention, improving the magnetic field intensity, the magnetic field distribution, and the magnetic field gradient allows a perpendicular recording magnetic head offering a narrow track width and sufficient recording capacity, thereby achieving higher track densities and higher recording densities.

Figure 3A:
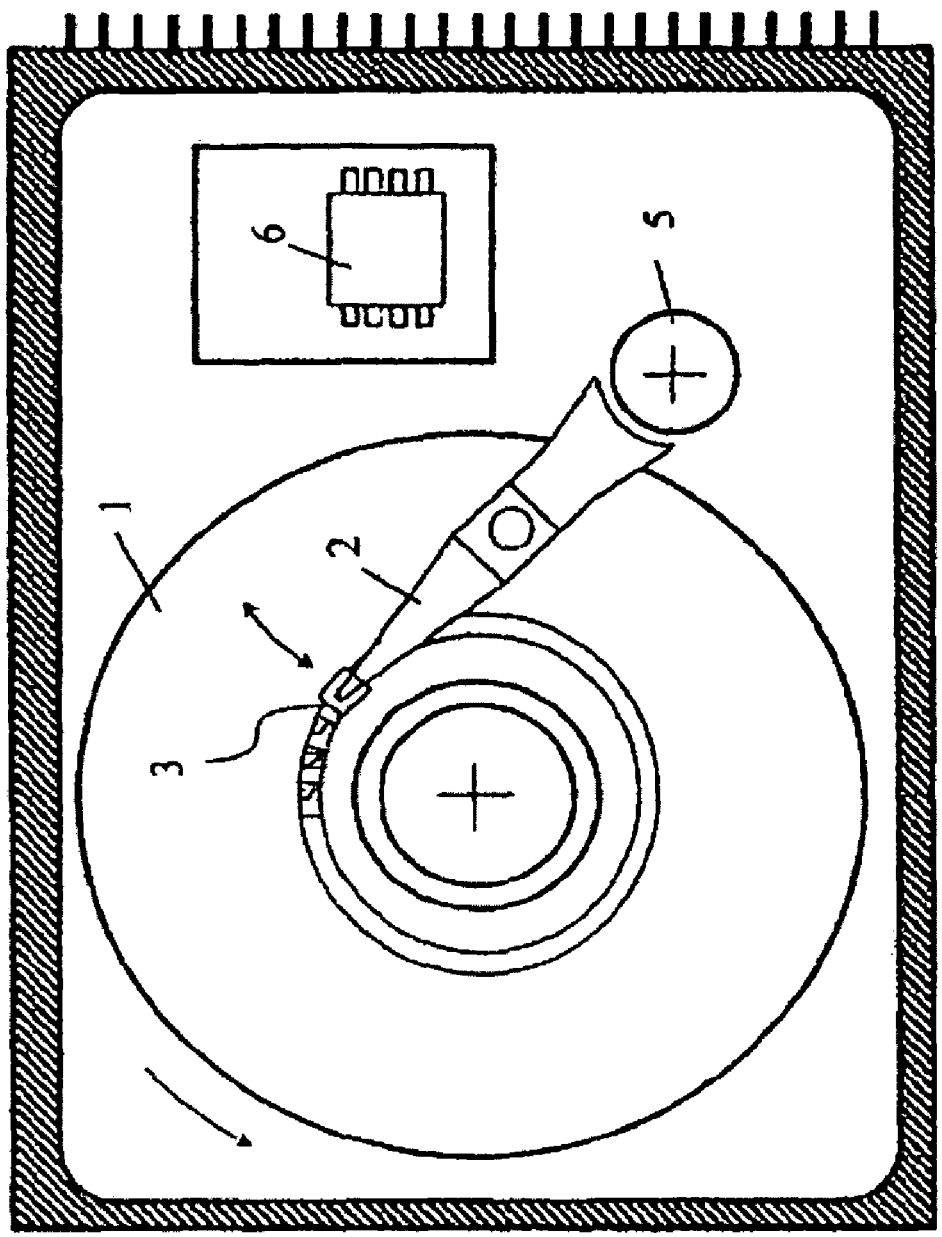
FIG. 3A is a plan view showing a magnetic disk drive mounted with the perpendicular recording magnetic head according to the first embodiment of the present invention.
Figure 3B:
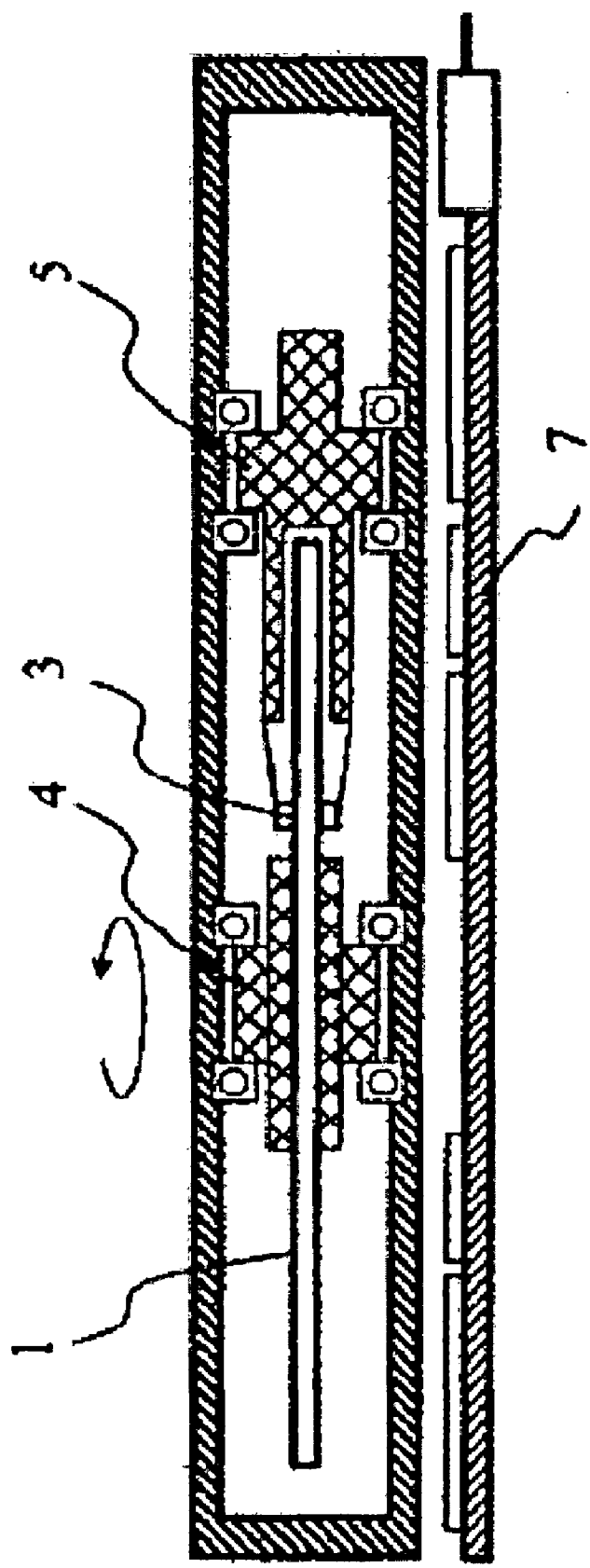
FIG. 3B is a cross-sectional view showing the magnetic disk drive mounted with the perpendicular recording magnetic head according to the first embodiment of the present invention.

FIGS. 3A and 3B are views showing a basic configuration of a magnetic disk drive using the perpendicular recording system. FIG. 3A is a plan view showing the magnetic disk drive. FIG. 3B is a cross-sectional view showing the magnetic disk drive. The magnetic disk drive includes a motor 4, a magnetic disk 1 directly connected to and rotatably driven by the motor 4, an arm 2 supported by a rotary actuator 5, and a perpendicular recording magnetic head 3 fixed to an leading end of the arm 2. The perpendicular recording magnetic head 3 moves above a surface of the recording medium 1 as the rotary actuator 5 rotates and is positioned at any location. The magnetic head 3 then writes or reads magnetic information. A write signal driving the magnetic head 3 or a read signal transmitted therefrom is processed by a read/write circuit 6 and a signal processing circuit 7.

A perpendicular recording magnetic head according to a first embodiment of the present invention will be described below with reference to FIG. 1. A read section 11 includes a head for reading information written in a recording layer of the magnetic disk. The read section 11 includes a read element 23 sandwiched between two magnetic shield layers 21, 22. Types of elements to be used for the read element 23 includes a giant magnetoresistive effect element (GMR), a tunneling magnetoresistive effect element (TMR), and a CPP type (Current Perpendicular to Plane) GMR in which current is passed perpendicularly to a film surface. A write section 12 includes a head that generates a magnetic field for recording information on the recording layer of the magnetic disk. The write section 12 includes a coil conductor 39 and soft magnetic layers that enclose the coil conductor 39 from upper and lower sides thereof and are magnetically coupled to each other. The soft magnetic layers include: a lower sub magnetic pole layer (a first sub magnetic pole layer) 31 and an upper sub magnetic pole layer (a second sub magnetic pole layer) 34; a lower auxiliary magnetic pole layer (a first soft magnetic layer) 32 and an upper auxiliary magnetic pole layer (a second soft magnetic layer) 33; a main magnetic pole layer 35 sandwiched between the lower and upper auxiliary magnetic pole layer 32, 33; a first back contact portion 37 magnetically coupling the lower sub magnetic pole layer 31 and the lower auxiliary magnetic pole layer 32 on a side opposite an air bearing surface 41; a second back contact portion 38 magnetically coupling the upper sub magnetic pole layer 34 and the upper auxiliary magnetic pole layer 33 on the side opposite the air bearing surface 41; and a pedestal-like magnetic layer 36 disposed on a trailing side of the main magnetic pole layer 35 by way of a non-magnetic layer at the air bearing surface 41. The pedestal magnetic layer 36 is magnetically coupled to the upper sub magnetic pole layer 34. The pedestal magnetic layer 36 may have a configuration, as viewed from a medium opposing surface, of a trailing shield type or a trailing and side shield type. Specifically, the magnetic layer 36 of the trailing shield type is disposed in parallel with an upper side of the main magnetic pole layer 35 by way of a non-magnetic gap. The magnetic layer 36 of the trailing and side shield type covers the upper side and a side surface of the main magnetic pole layer 35 by way of a non-magnetic gap. The main magnetic pole layer 35 on the air bearing surface 41 has an inverted trapezoidal shape, as viewed from the medium opposing surface, having a long side on the trailing side. This is done to prevent information from being written in adjacent tracks at the time of skew. The coil conductor 39 may be a helical type or a pancake type. In the helical type, the coil conductor 39 is wound so as to go around the two auxiliary magnetic pole layers 32, 33 and the main magnetic pole layer 35 sandwiched therebetween. In the pancake type, each of a lower portion and an upper portion of the coil conductor 39 disposed about the main magnetic pole layer 35 goes around the first back contact portion 37 and the second back contact portion 38, respectively. In the pancake type coil, the direction in which current flows through the coil conductor 39 for write operations is antiparallel in the lower portion and the upper portion of the coil conductor 39 about the main magnetic pole layer 35.

The lower and upper auxiliary magnetic pole layers 32, 33 disposed adjacent to the main magnetic pole layer 35 on the trailing side and the leading side, respectively, relative to a medium moving direction, are retracted from the air bearing surface 41. The smaller the amount of retraction of the lower and upper auxiliary magnetic pole layers 32, 33 from the air bearing surface 41, the higher the intensity of a magnetic field generated from the main magnetic pole layer 35. If the amount of retraction is too small, however, there is a magnetic field leak directly from the lower and upper auxiliary magnetic pole layers 32, 33 to the magnetic disk as a recording medium. As a result, the magnetic field distribution expands in the direction of a track width, producing an adverse effect on the attempt to narrow the track width. Preferably, the amount of retraction of the lower and upper auxiliary magnetic pole layers 32, 33 generally falls in a range between 0.1 μm and 2.5 μm.

The magnetic field coming from the main magnetic pole layer 35 to determine the recording track width forms a magnetic circuit that passes through the recording layer and a soft magnetic backing layer of the magnetic disk and enters the lower and upper sub magnetic pole layers 31, 34. The magnetic field thereby records a magnetization pattern on the recording layer. At this time, because of a disk rotating direction involved, the magnetic field distribution at the rearmost portion of the main magnetic pole layer 35 as the main magnetic pole layer 35 moves past a specific point on the magnetic disk, specifically, the trailing side of the main magnetic pole layer 35 greatly affects the shape of the magnetization pattern. To achieve high recording densities, high magnetic field intensity and a high magnetic field gradient are required of the magnetic field distribution of the trailing side. Such an ideal magnetic field distribution is realized more effectively, if the amount of retraction of the lower auxiliary magnetic pole layer 32 from the air bearing surface 41 is greater than that of the upper auxiliary magnetic pole layer 33 from the air bearing surface 41.

Figure 2A:
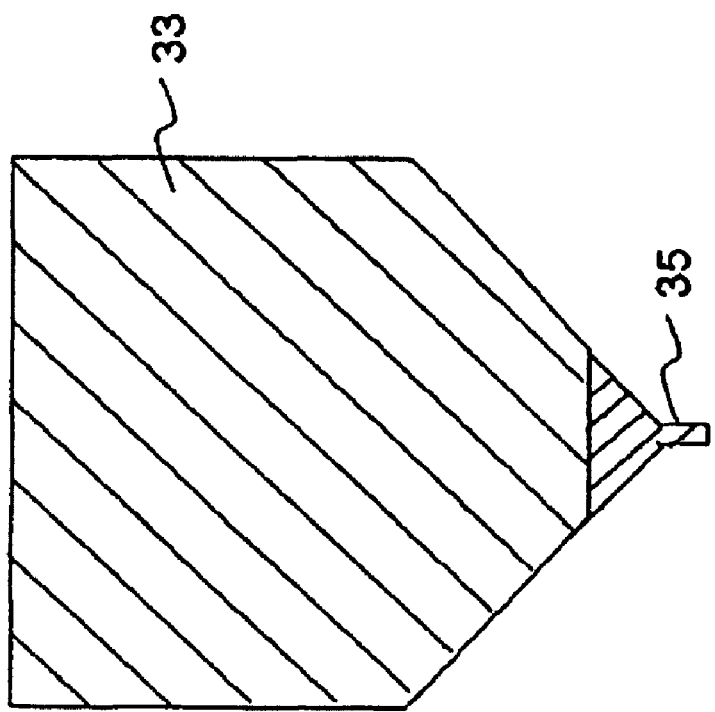
FIG. 2A is a plan view showing a tapered shape of an auxiliary magnetic pole layer.
Figure 2B:
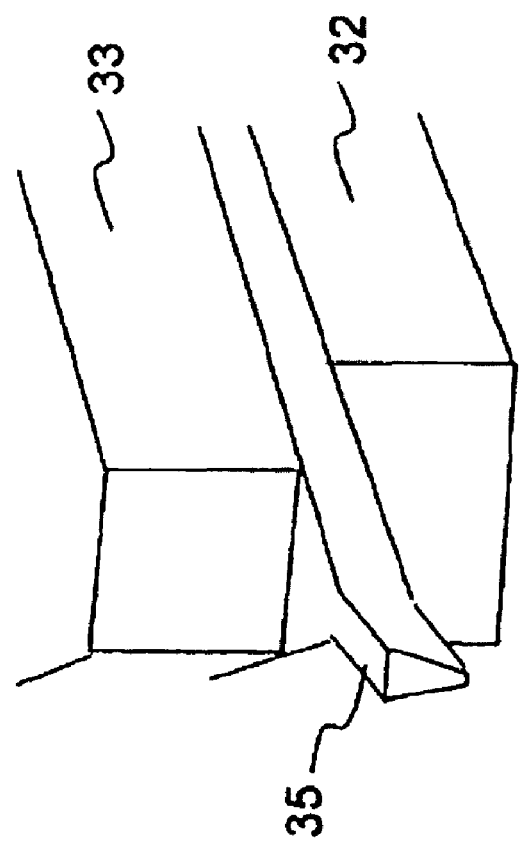
FIG. 2B is a perspective view showing the tapered shape of the auxiliary magnetic pole layer.

FIG. 2A is a plan view showing a typical tapered shape of the auxiliary magnetic pole layer according to the first embodiment of the present invention. The main magnetic pole layer 35 is shaped to have a leading end portion and a flare portion. The upper auxiliary magnetic pole layer 33 is tapered, facing the air bearing surface, to follow along an opening angle of the flare portion of the main magnetic pole layer 35. Though not shown in FIG. 2A, the lower auxiliary magnetic pole layer 32 is shaped in the same manner as the upper auxiliary magnetic pole layer 33. FIGS. 2B and 2C are perspective views showing examples of tapered shapes of the auxiliary magnetic pole layer. FIG. 2B shows an example, in which the lower and upper auxiliary magnetic pole layers 32, 33 are tapered by the opening angle only. FIG. 2C shows an example, in which the upper auxiliary magnetic pole layer 33 is tapered through changes in the film thickness toward the air bearing surface, in addition to being tapered by the opening angle of the lower and upper auxiliary magnetic pole layers 32, 33. The lower auxiliary magnetic pole layer 32 may also be tapered through changes in the film thickness.

Figure 4:
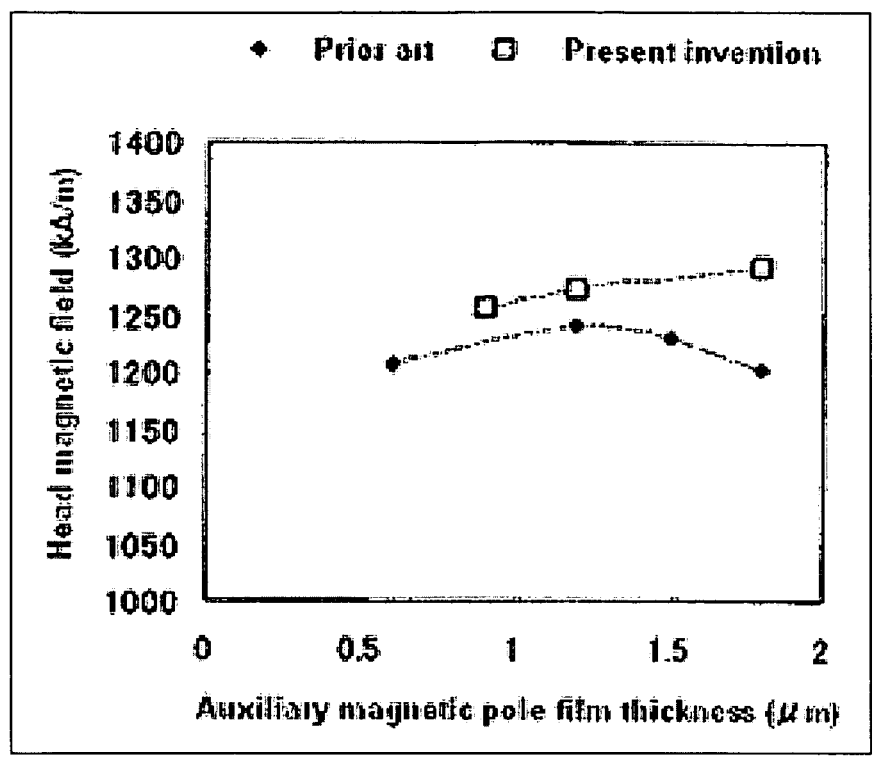
FIG. 4 is a graph showing a relationship between a film thickness of the auxiliary magnetic pole layer and a head magnetic field.
Figure 11:
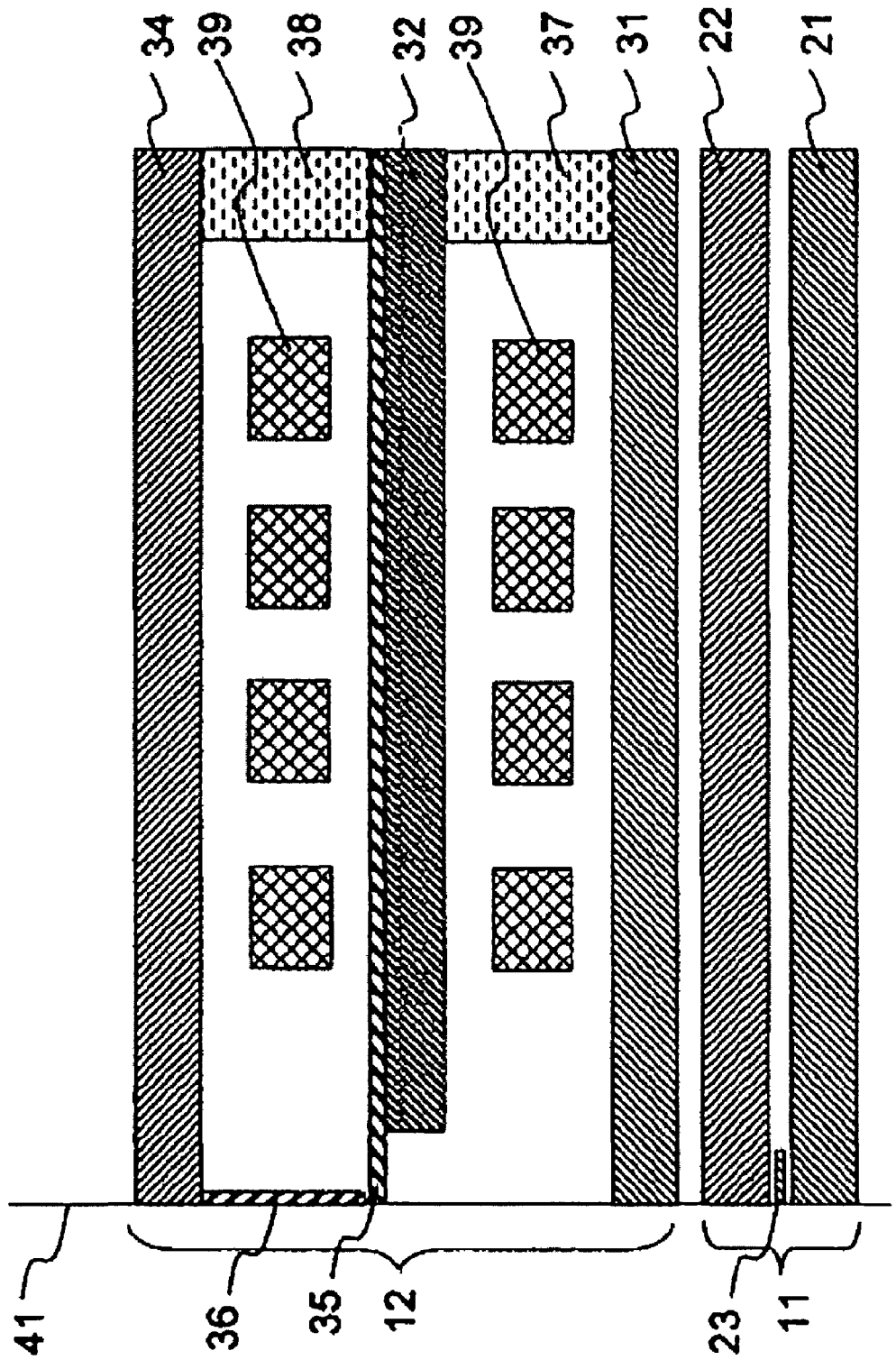
FIG. 11 is a cross-sectional view showing a conventional perpendicular recording magnetic head.
Figure 12:
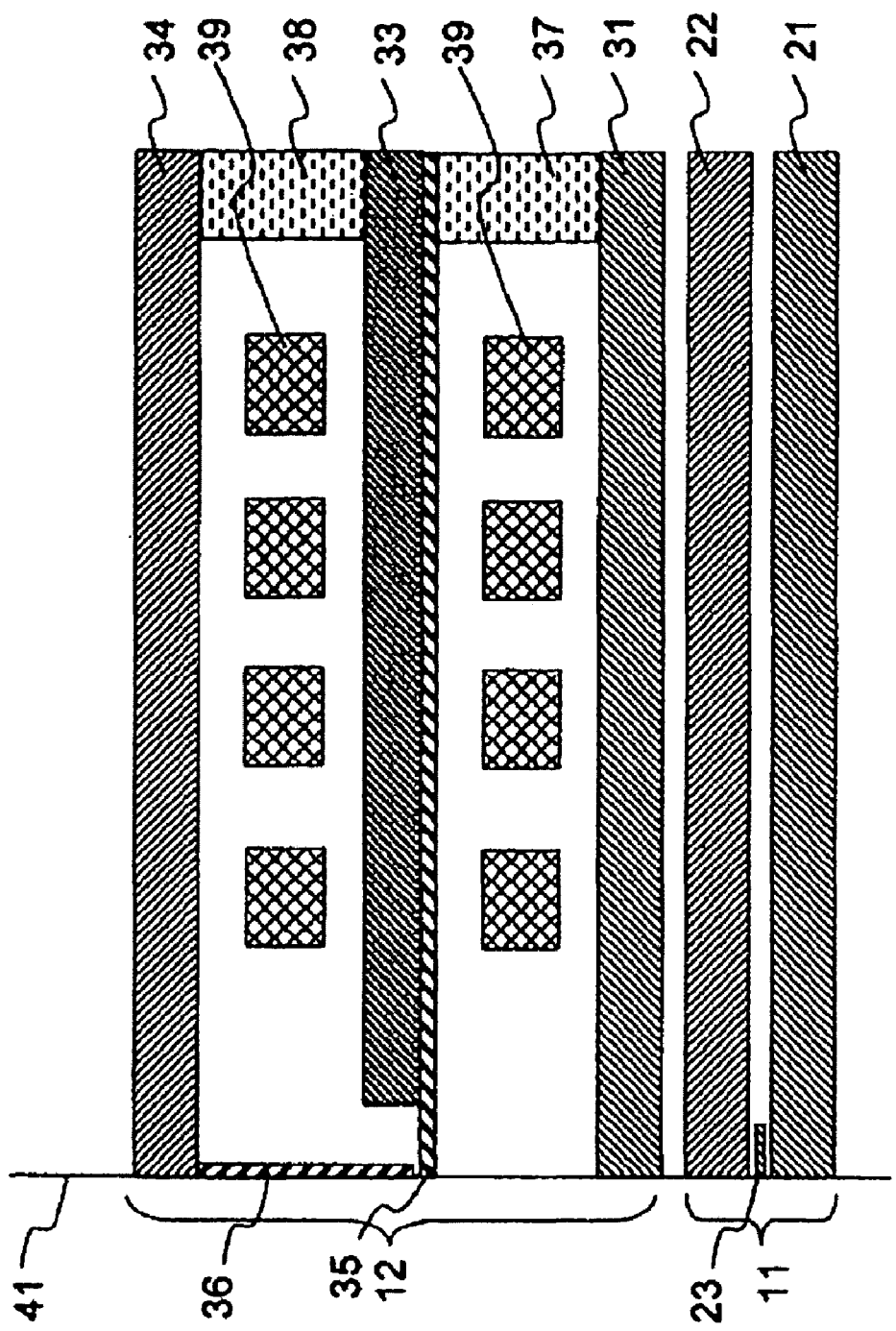
FIG. 12 is a cross-sectional view showing a conventional perpendicular recording magnetic head.

FIG. 4 is a graph showing changes in the head magnetic field of the magnetic head according to the first embodiment of the present invention relative to the auxiliary magnetic pole layer film thickness in the medium moving direction, as obtained through simulation. Values of the auxiliary magnetic pole layer film thickness represent those of the lower and upper auxiliary magnetic pole layers 32, 33 totaled. The simulation was performed with the following constant values to define the shape of the main magnetic pole layer 35: film thickness: 200 nm; flare point: 60 nm; track width: 110 nm; and bevel angle of the inverted trapezoidal shape: 8 degrees. The graph compares the simulation results of the first embodiment of the present invention with those of the conventional arrangement. For both the first embodiment of the present invention and the conventional arrangement, the amount of retraction of the auxiliary magnetic pole layer from the air bearing surface 41 is 2.0 μm constant. The conventional arrangement has already been embodied. Referring to FIGS. 11 and 12, an auxiliary magnetic pole layer is disposed either on a leading side or a trailing side of a main magnetic pole. In the conventional arrangement, increasing the film thickness of the auxiliary magnetic pole layer does not increase the head magnetic field directly proportionately thereto; rather, the head magnetic field changes so as to peak out with a film thickness of about 1.3 μm. In the arrangement of the first embodiment of the present invention, on the other hand, the head magnetic field increases directly proportional to the auxiliary magnetic pole layer film thickness. When comparing the first embodiment of the present invention and the conventional arrangement in terms of the head magnetic field at the same auxiliary magnetic pole layer film thickness value, it is known that the first embodiment of the present invention, in which the lower and upper auxiliary magnetic pole layers 32, 33 are disposed on the leading side and the trailing side, respectively, of the main magnetic pole layer 35, yields a head magnetic field of about 5 to 10% as large as that of the prior art arrangement.

Figure 5:
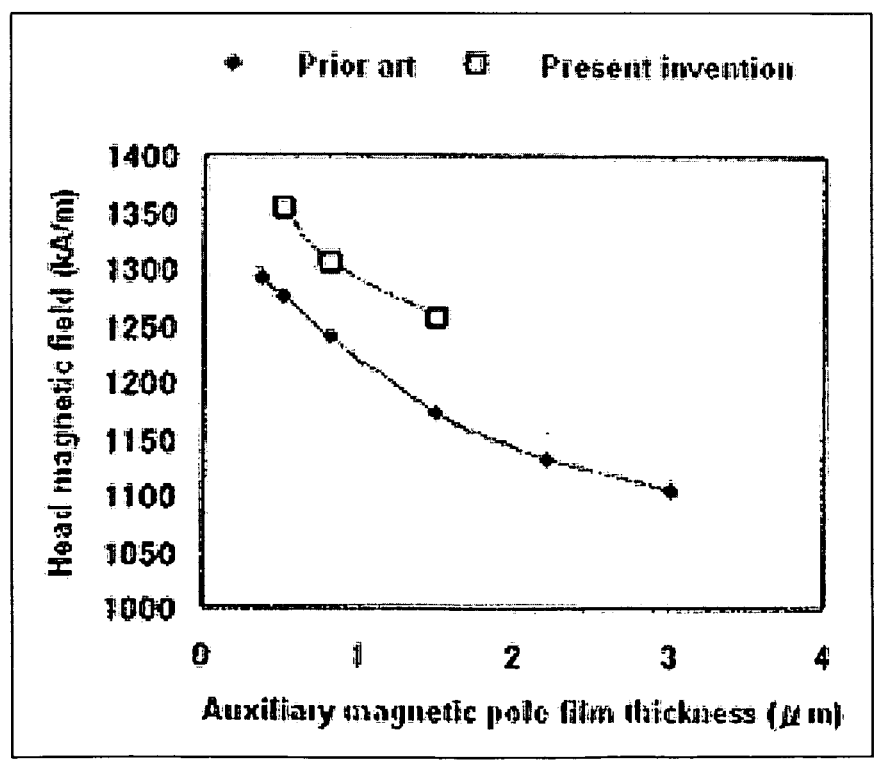
FIG. 5 is a graph showing a relationship between the amount of retraction of the auxiliary magnetic pole layer from an air bearing surface and the head magnetic field.

FIG. 5 is a graph showing a relationship between the amount of retraction of the auxiliary magnetic pole layer from the air bearing surface 41 and the head magnetic field obtained through simulation. The following constant values were used to define the shape of the main magnetic pole layer: film thickness: 200 nm; flare point: 60 nm; track width: 110 nm; and bevel angle of the inverted trapezoidal shape: 8 degrees. In each of the first embodiment of the present invention and the conventional arrangement, the film thickness of the auxiliary magnetic pole layer in the medium moving direction was 2.0 μm constant. In addition, in the first embodiment of the present invention, the amount of retraction, from the air bearing surface 41, of the lower auxiliary magnetic pole layer 32 disposed on the trailing side of the main magnetic pole layer 35 was 2.0 μm constant. Meanwhile, the amount of retraction of only the upper auxiliary magnetic pole layer 33 disposed on the trailing side of the main magnetic pole layer was varied. The head magnetic field increases as the auxiliary magnetic pole layer approaches near the medium opposing surface. It is known that the amount of retraction of the auxiliary magnetic pole layer from the air bearing surface to generate the same head magnetic field can be made larger by about 0.5 μm in the arrangement of the first embodiment of the present invention as compared with the conventional arrangement. As such, a greater amount of retraction of the auxiliary magnetic pole layer can be taken in the first embodiment of the present invention. As a result, the magnetic field directly leaking from the auxiliary magnetic pole layer to the recording medium can be reduced. This helps suppress expansion of the magnetic field distribution in the track width direction.

As described heretofore, in the arrangement according to the first embodiment of the present invention, the head magnetic field can be substantially improved as compared with conventional approaches by adjusting the film thickness of the lower and upper auxiliary magnetic pole layers and the amount of retraction thereof from the air bearing surface. This is extremely effective in the attempt to narrow the track width. The increase in the head magnetic field allows the flare point to be set longer than in the conventional arrangement. This contributes to reduction in variations in the track width.

Figure 6:
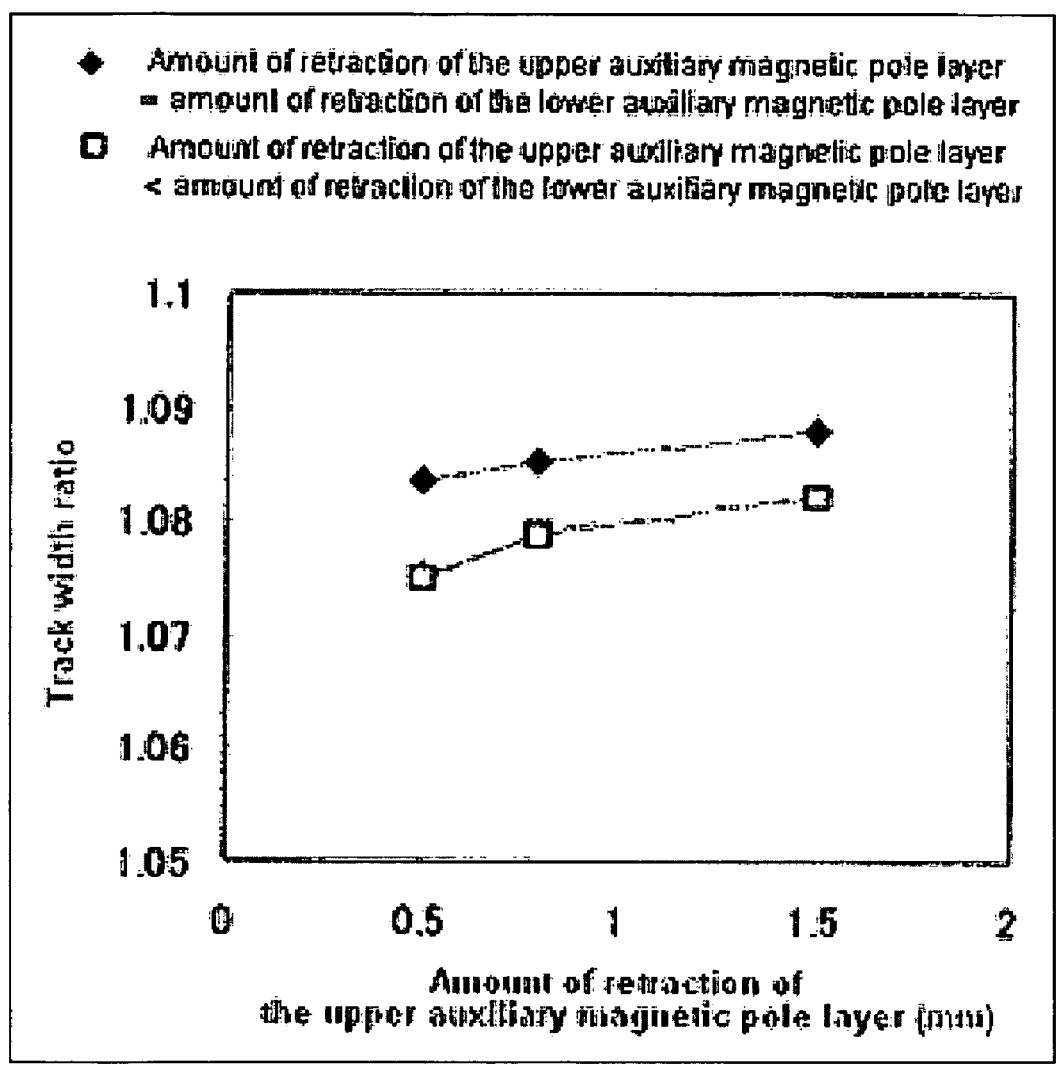
FIG. 6 is a graph showing a relationship between the amount of retraction of an upper auxiliary magnetic pole layer from the air bearing surface and a ratio of a track width at a skew angle of 20 degrees to the track width at a skew angle of 0 degrees.

FIG. 6 is a graph showing changes in a ratio of the track width at a skew angle of 20 degrees to the track width at a skew angle of 0 degrees, relative to the amount of retraction of the auxiliary magnetic pole layer 33 on the trailing side of the main magnetic pole layer 35 from the air bearing surface 41, as obtained through simulation. The graph shows results of the simulation in two cases. In one case, the amount of retraction of the lower auxiliary magnetic pole layer 32 of the main magnetic pole layer 35 from the air bearing surface 41 is the same as that of the upper auxiliary magnetic pole layer 33 of the main magnetic pole layer 35 from the air bearing surface 41; and in the other, the amount of retraction of only the upper auxiliary magnetic pole layer 33 is varied with the amount of retraction of the lower auxiliary magnetic pole layer 32 kept at constant 2.0 μm. The graph of FIG. 6 shows that the amount of expansion of the track width with a skew angle can be suppressed when the amount of retraction of only the upper auxiliary magnetic pole layer 33 is made small, specifically, the amount of retraction of the upper auxiliary magnetic pole layer 33 is smaller than that of the lower auxiliary magnetic pole layer 32. This indicates that, in the arrangement having a smaller amount of retraction of the upper auxiliary magnetic pole layer 33, the head magnetic field exhibits a distribution localized on the trailing side of the main magnetic pole layer 35.

As described above, the arrangement, in which the amount of retraction of the auxiliary magnetic pole layer 33 on the trailing side of the main magnetic pole layer 35 is smaller than that of the auxiliary magnetic pole layer 32 on the leading side of the main magnetic pole layer 35, helps not only increase the magnetic field intensity, but also improve the magnetic field distribution in the track width direction and magnetic field gradient. These effects make it possible to achieve a perpendicular magnetic recording apparatus offering a high track density and a high recording density.

Figure 7:
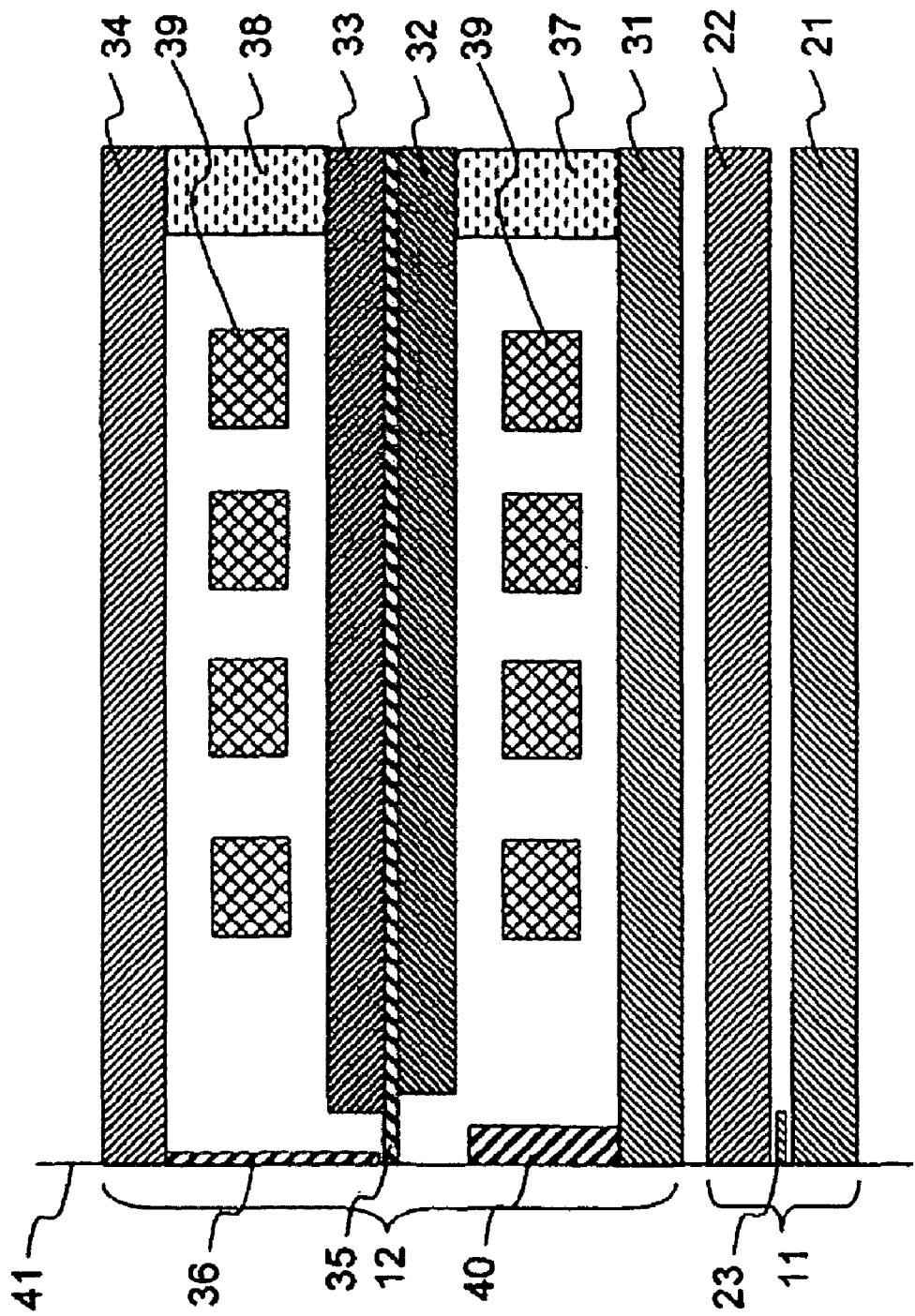
FIG. 7 is a cross-sectional view showing a perpendicular recording magnetic head structure according to a first modified example of the first embodiment of the present invention.

FIG. 7 is a cross-sectional view showing a perpendicular magnetic recording head structure according a first modified example of the first embodiment of the present invention. The structure according to the first modified example of the first embodiment of the present invention includes a pedestal-like sub magnetic pole layer (pedestal magnetic pole layer) 40 magnetically coupled to an air bearing surface of a lower sub magnetic pole layer 31. The pedestal sub magnetic pole layer 40 functions to disperse a magnetic field that is generated from a main magnetic pole layer 35, passes through a soft magnetic backing layer of a recording medium, and flows back to the lower sub magnetic pole layer 31. This alleviates the problem of information on the recording medium being widely erased.

Figure 8:
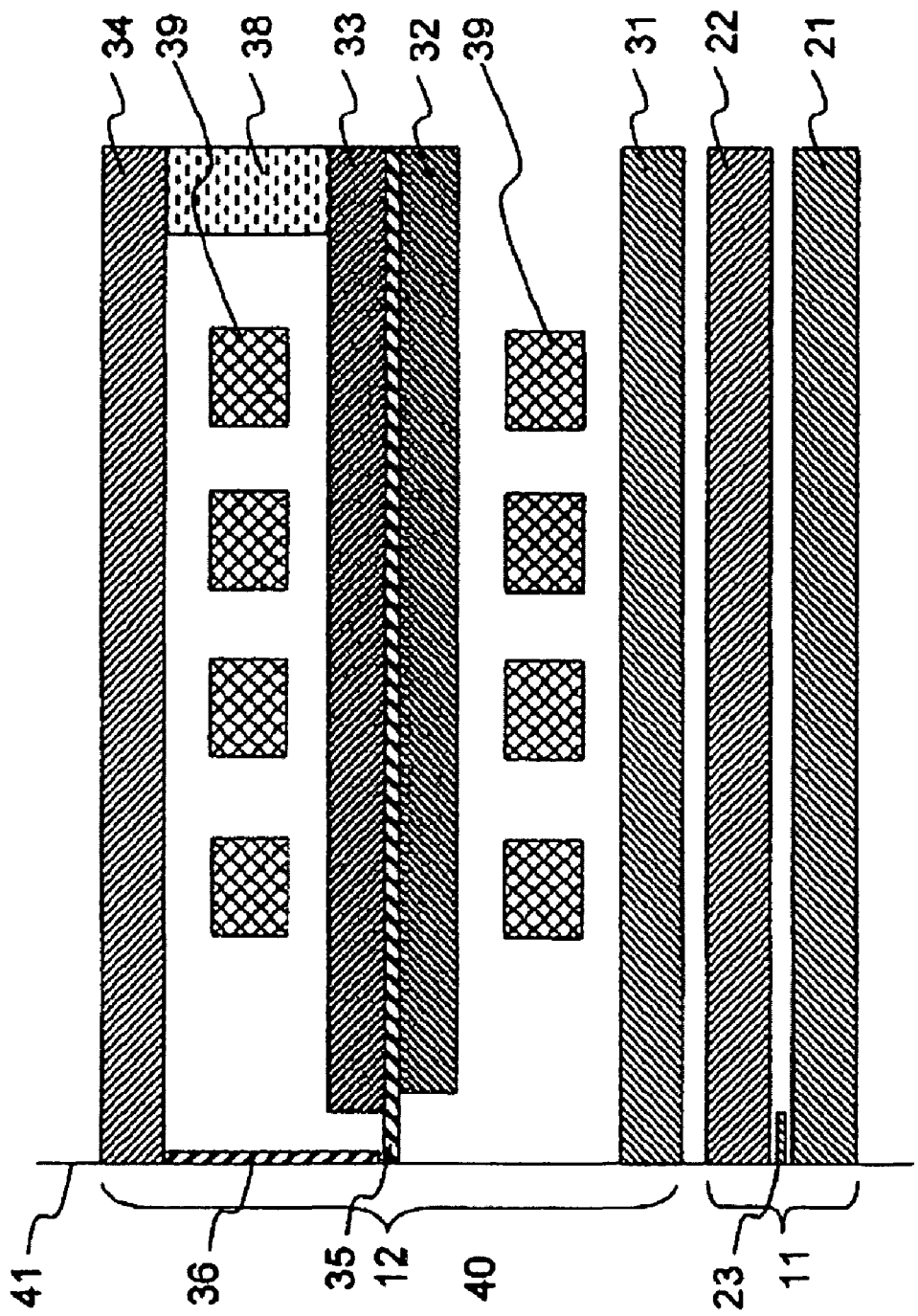
FIG. 8 is a cross-sectional view showing a perpendicular recording magnetic head structure according to a second modified example of the first embodiment of the present invention.

FIG. 8 is a cross-sectional view showing a perpendicular magnetic recording head structure according a second modified example of the first embodiment of the present invention. The structure according to the second modified example of the first embodiment of the present invention does not have a first back contact portion 37, so that a lower sub magnetic pole layer 31 and a lower auxiliary magnetic pole layer 32 are magnetically isolated from each other. In this configuration, a good part of the magnetic field from a main magnetic pole layer 35 flows back to an upper sub magnetic pole layer 34 and a pedestal magnetic layer 36 disposed on a trailing side of the main magnetic pole layer 35. This allows the magnetic field gradient at the trailing portion to be improved.

Figure 9:
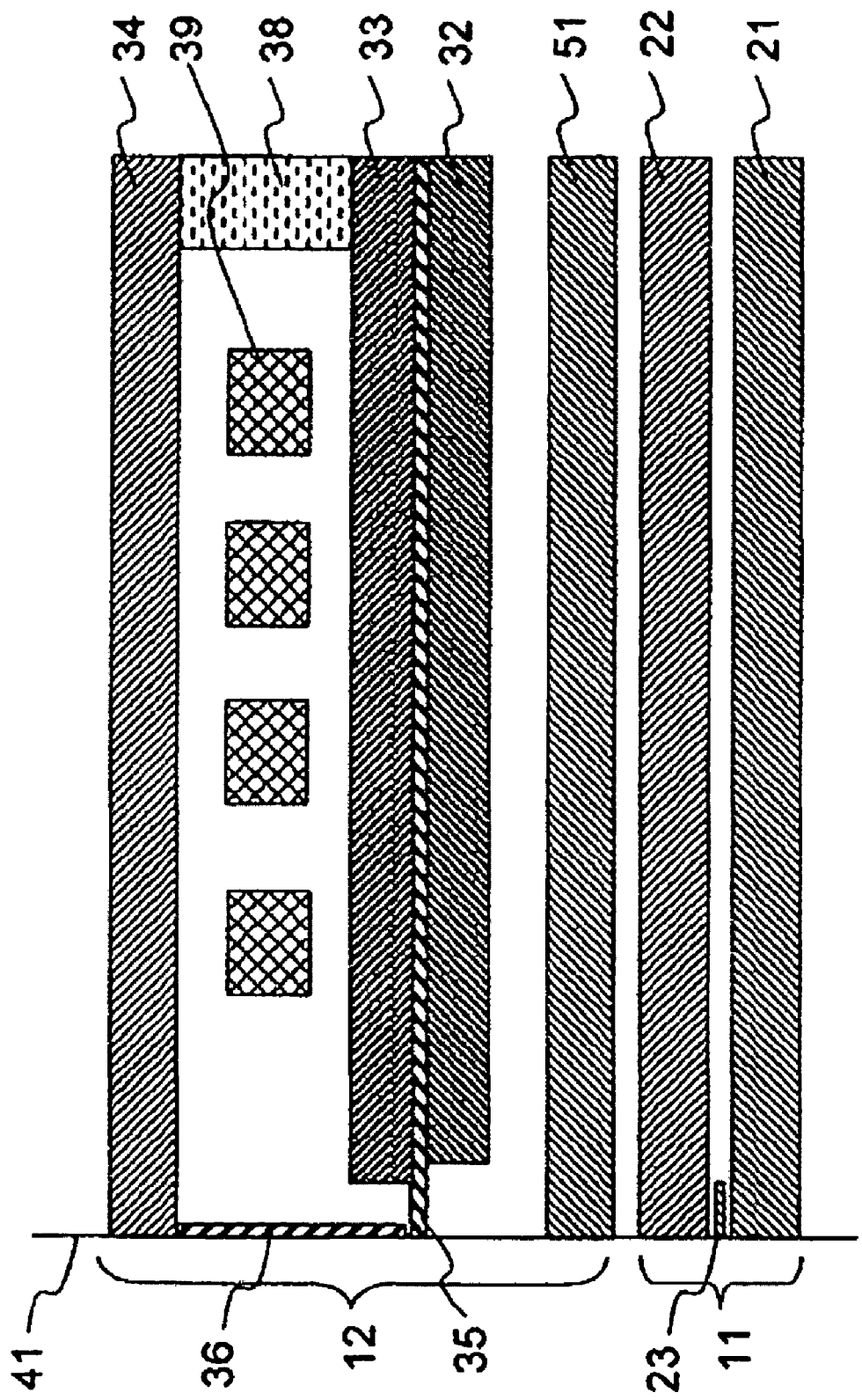
FIG. 9 is a cross-sectional view showing a perpendicular recording magnetic head structure according to a second embodiment of the present invention.

FIG. 9 is a cross-sectional view showing a perpendicular magnetic recording head structure according a second embodiment of the present invention. The structure according to the second embodiment of the present invention includes a coil conductor 39 disposed on a trailing side of a main magnetic pole layer 35 and of the pancake type configured to go around a back contact portion 38. This structure allows the height of a perpendicular recording magnetic head to be held low, so that a small distance can be set between a read section 11 and the main magnetic pole layer 35. As a result, recording format efficiency of the magnetic disk can be increased. It is, however, preferable that an intermediate magnetic shield layer (a third soft magnetic layer) 51 for softening the head magnetic field from the main magnetic pole layer 35 be disposed between a magnetic shield layer 22 of the read section 11 and a lower auxiliary magnetic pole layer 32.

Figure 10:
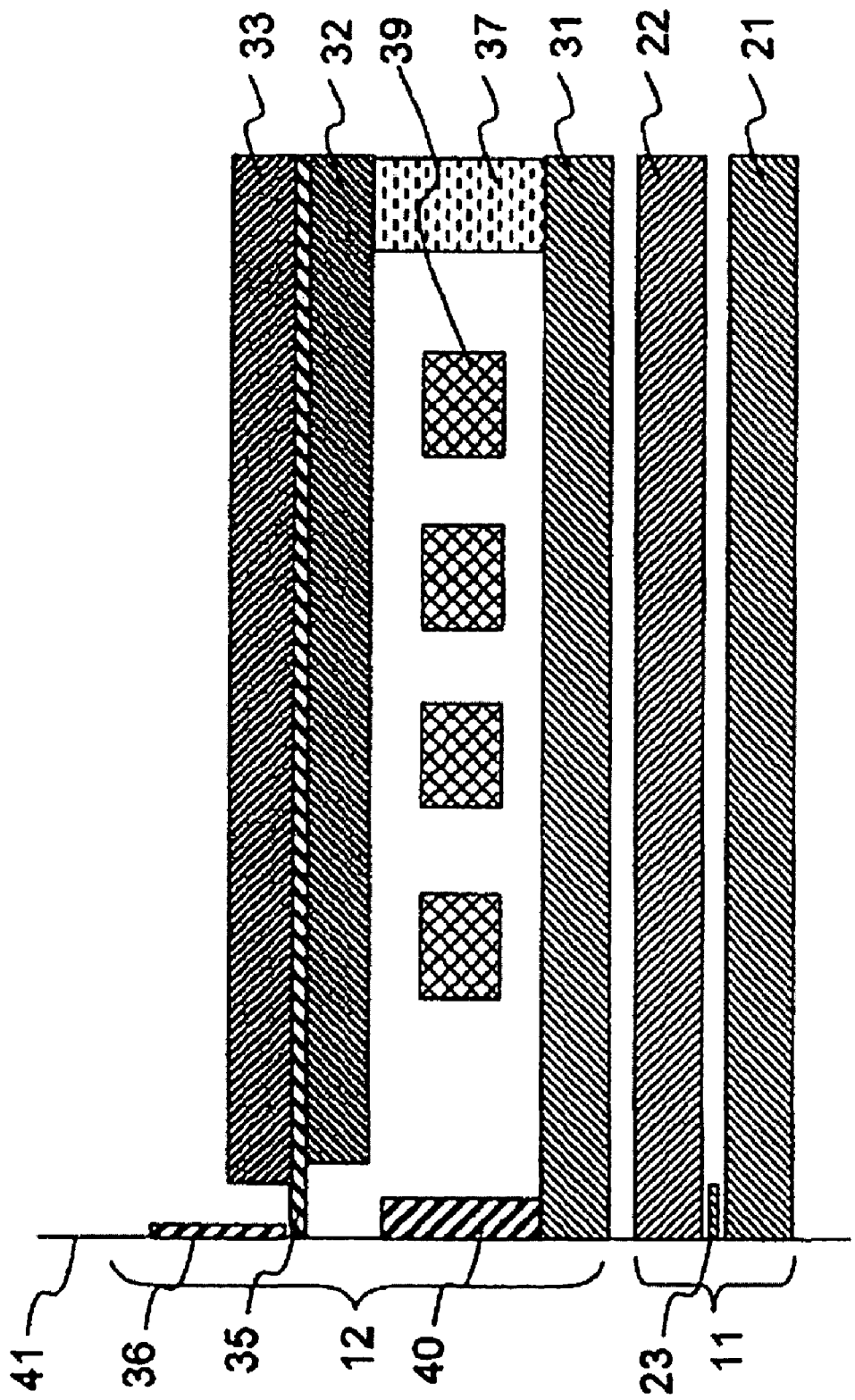
FIG. 10 is a cross-sectional view showing a perpendicular recording magnetic head structure according to a modified example of the second embodiment of the present invention.

FIG. 10 is a cross-sectional view showing a perpendicular magnetic recording head structure according a modified example of the second embodiment of the present invention. The structure according to the modified example of the second embodiment of the present invention includes a coil conductor 39 disposed on a leading side of a main magnetic pole layer 35 and of the pancake type configured to go around a back contact portion 37. The structure further includes a pedestal magnetic layer 36 disposed on a trailing side of the main magnetic pole layer 35 by way of a non-magnetic layer at an air bearing surface 41. The pedestal magnetic layer 36 is not magnetically connected to any other portions of a write section 12. This arrangement helps keep even lower the height of the perpendicular recording magnetic head.

Even in the arrangements shown in FIGS. 9 and 10, by having a smaller amount of retraction of the upper auxiliary magnetic pole layer 33 from the air bearing surface 41 relative to the amount of retraction of the lower auxiliary magnetic pole layer 32 from the air bearing surface 41, the head magnetic field intensity can be enhanced and the magnetic field distribution and magnetic field gradient can be improved. Narrower track density and high recording density can thereby be achieved.

What is claimed is:

1. A perpendicular recording magnetic head, comprising:
   a write section including:
   a main magnetic pole layer having a leading end portion and a flare portion;
   a first soft magnetic layer having a leading end retracted from an air bearing surface and disposed adjacent to a leading side of the main magnetic pole layer;
   a second soft magnetic layer having a leading end retracted from the air bearing surface closer than the leading end of the first soft magnetic layer and disposed adjacent to a trailing side of the main magnetic pole layer;
   a first sub magnetic pole layer disposed on the leading side of the main magnetic pole layer with a gap from the main magnetic pole layer at a side of the air bearing surface;
   a pedestal magnetic layer disposed by way of a non-magnetic layer on the trailing side of the main magnetic pole layer at the side of the air bearing surface;
   a second sub magnetic pole layer disposed on the trailing side of the main magnetic pole layer, the second sub magnetic pole layer being magnetically coupled to the pedestal magnetic layer at the side of the air bearing surface; and
   a coil conductor generating a magnetic flux in the main magnetic pole layer; and
   a read section disposed adjacent to the write section, the read section including a read element disposed between upper and lower magnetic shield layers,
   wherein the first soft magnetic layer and the second soft magnetic layer are tapered, facing the air bearing surface, to follow along an opening angle of the flare portion of the main magnetic pole layer.

2. The perpendicular recording magnetic head according to claim 1,
   wherein an amount of retraction of the first soft magnetic layer and the second soft magnetic layer ranges between 0.1 μm and 2.5 μm.

3. The perpendicular recording magnetic head according to claim 1, wherein the first soft magnetic layer and the second soft magnetic layer are tapered through changes in a film thickness toward the air bearing surface.

4. The perpendicular recording magnetic head according to claim 1, further comprising:
   a pedestal magnetic pole layer disposed on a trailing side of the first sub magnetic pole layer at the side of the air bearing surface.

5. The perpendicular recording magnetic head according to claim 1,
   wherein the first sub magnetic pole layer has a rear end magnetically coupled to the first magnetic layer;
   wherein the second sub magnetic pole layer has a rear end magnetically coupled to the second magnetic layer; and
   wherein the coil conductor is disposed so as to go around the main magnetic pole layer and the first and second soft magnetic layers.

6. The perpendicular recording magnetic head according to claim 1,
   wherein the second sub magnetic pole layer has a rear end magnetically coupled to the second magnetic layer; and
   wherein the coil conductor is disposed so as to go around the main magnetic pole layer and the first and second soft magnetic layers.

7. The perpendicular recording magnetic head according to claim 1,
   wherein the first sub magnetic pole layer has a rear end magnetically coupled to the first magnetic layer;
   wherein the second sub magnetic pole layer has a rear end magnetically coupled to the second magnetic layer; and
   wherein the coil conductor includes a first coil interlinking a magnetic circuit including the first sub magnetic pole layer and the first magnetic layer and a second coil conductor interlinking a magnetic circuit including the second sub magnetic pole layer and the second magnetic layer.

8. The perpendicular recording magnetic head according to claim 1, further comprising:
   side shields disposed on both sides of the main magnetic pole layer by way of non-magnetic layers.

9. A perpendicular recording magnetic head, comprising:
   a write section including:
   a main magnetic pole layer having a leading end portion and a flare portion;
   a first soft magnetic layer having a leading end retracted from an air bearing surface and disposed adjacent to a leading side of the main magnetic pole layer;
   a second soft magnetic layer having a leading end retracted from the air bearing surface closer than the leading end of the first soft magnetic layer and disposed adjacent to a trailing side of the main magnetic pole layer;
   a sub magnetic pole layer disposed with a gap from the main magnetic pole layer at a side of the air bearing surface;
   a pedestal magnetic layer disposed by way of a non-magnetic layer on the trailing side of the main magnetic pole layer at the side of the air bearing surface; and
   a coil conductor generating a magnetic flux in the main magnetic pole layer; and a read section disposed adjacent to the write section, the read section including a read element disposed between upper and lower magnetic shield layers, wherein the first soft magnetic layer and the second soft magnetic layer are tapered, facing the air bearing surface, to follow along an opening angle of the flare portion of the main magnetic pole layer.

10. The perpendicular recording magnetic head according to claim 9, wherein the sub magnetic pole layer is disposed on the trailing side of the main magnetic pole layer and has a rear end magnetically coupled to the second soft magnetic layer;

wherein the coil conductor is disposed so as to interlink a magnetic circuit including the sub magnetic pole layer and the second soft magnetic layer; and wherein a third soft magnetic layer is disposed between the read section and the first soft magnetic layer.

11. The perpendicular recording magnetic head according to claim 9, wherein the sub magnetic pole layer is disposed on a leading side of the main magnetic pole layer and has a rear end magnetically coupled to the first soft magnetic layer;

wherein the coil conductor is disposed so as to interlink a magnetic circuit including the sub magnetic pole layer and the first soft magnetic layer; and wherein a pedestal magnetic pole layer is disposed on a trailing side of the sub magnetic pole layer at the side of the air bearing surface.

12. The perpendicular recording magnetic head according to claim 9, wherein an amount of retraction of the first soft magnetic layer and the second soft magnetic layer ranges between 0.1 μm and 2.5 μm.

13. The perpendicular recording magnetic head according to claim 9, wherein the first soft magnetic layer and the second soft magnetic layer are tapered through changes in a film thickness toward the air bearing surface.

* * * * *

UNITED STATES PATENT AND TRADEMARK OFFICE
CERTIFICATE OF CORRECTION

PATENT NO.        : 8,054,580 B2
APPLICATION NO.   : 12/079223
DATED             : November 8, 2011
INVENTOR(S)       : Kimura et al.

It is certified that error appears in the above-identified patent and that said Letters Patent is hereby corrected as shown below:

In the Title Page section 75 Inventors:

replace "Yohji Marujama" with --Yohji Maruyama--

In the Title Page section 73 Assignee:

replace "Gloabl" with --Global--;

Signed and Sealed this
Seventeenth Day of January, 2012

David J. Kappos
*Director of the United States Patent and Trademark Office*